(12) United States Patent
Hod et al.

(10) Patent No.: US 8,830,088 B2
(45) Date of Patent: Sep. 9, 2014

(54) ZONE CONTROLLER

(71) Applicant: TCS International, Inc., Sudbury, MA (US)

(72) Inventors: Arie Hod, Scarborough (CA); Valerie Wirt, Sudbury, MA (US)

(73) Assignee: TCS International, Inc., Sudbury, MA (US)

( * ) Notice: Subject to any disclaimer, the term of this patent is extended or adjusted under 35 U.S.C. 154(b) by 27 days.

(21) Appl. No.: 13/755,436

(22) Filed: Jan. 31, 2013

(65) Prior Publication Data

US 2014/0169134 A1 Jun. 19, 2014

Related U.S. Application Data

(60) Provisional application No. 61/738,767, filed on Dec. 18, 2012.

(51) Int. Cl.
*B60Q 1/48* (2006.01)
*G08G 1/14* (2006.01)

(52) U.S. Cl.
CPC ..................................... *G08G 1/141* (2013.01)
USPC .......................... 340/932.2; 340/933; 340/943

(58) Field of Classification Search
USPC ............ 340/932.2, 933, 943; 705/13; 367/93, 367/95
See application file for complete search history.

(56) References Cited

U.S. PATENT DOCUMENTS

| | | |
|---|---|---|
| 5,432,508 A | 7/1995 | Jackson |
| 5,504,314 A * | 4/1996 | Farmont ........................ 235/384 |
| 6,285,297 B1 | 9/2001 | Ball |
| 6,340,935 B1 | 1/2002 | Hall |
| 6,642,854 B2 | 11/2003 | McMaster |
| 6,970,101 B1 | 11/2005 | Squire et al. |
| 7,081,832 B2 | 7/2006 | Nelson et al. |
| 7,253,747 B2 | 8/2007 | Noguchi |
| 7,330,131 B2 | 2/2008 | Zanotti et al. |
| 7,382,278 B2 | 6/2008 | Buschman |
| 7,391,339 B2 | 6/2008 | Howard et al. |
| 7,492,283 B1 | 2/2009 | Racunas |
| 7,688,225 B1 | 3/2010 | Haynes et al. |
| 7,701,361 B2 | 4/2010 | Lee et al. |

(Continued)

FOREIGN PATENT DOCUMENTS

| | | |
|---|---|---|
| EP | 1 530 183 A2 | 5/2005 |
| EP | 2 090 897 A1 | 8/2009 |

OTHER PUBLICATIONS

European Patent Office, "Partial International Search Report", May 9, 2014, 5 pp.

*Primary Examiner* — Toan N Pham
(74) *Attorney, Agent, or Firm* — Eckert Seamans Cherin & Mellott, LLC; Nathanial C. Wilks

(57) ABSTRACT

A method includes transmitting a measurement command from a controller to an occupancy sensor with an address that corresponds to an occupancy sensor identifier. The measurement command causes the occupancy sensor to transmit an ultrasonic signal into a parking space, receive echo signals reflected back to the occupancy sensor, and determine, based on the echo signals, whether the associated parking space is occupied or empty. The method includes subsequently sending a status check to the occupancy sensor and receiving a response that includes the occupancy sensor's determination as to whether the associated parking space is occupied or empty. The method also includes calibrating the occupancy sensors from the controller.

30 Claims, 7 Drawing Sheets

(56) References Cited

U.S. PATENT DOCUMENTS

| | | |
|---|---|---|
| 7,714,742 B1 | 5/2010 | Noworolski et al. |
| 7,855,661 B2 * | 12/2010 | Ponert .................. 340/932.2 |
| 2002/0190856 A1 | 12/2002 | Howard |
| 2005/0280555 A1 | 12/2005 | Warner |
| 2007/0050240 A1 | 3/2007 | Belani et al. |
| 2007/0061192 A1 | 3/2007 | Chew |
| 2008/0136674 A1 | 6/2008 | Jang et al. |
| 2008/0165030 A1 | 7/2008 | Kuo et al. |
| 2009/0261988 A1 | 10/2009 | Ramirez Serrano |
| 2009/0276236 A1 | 11/2009 | Adamczyk |
| 2009/0309760 A1 | 12/2009 | Chew |
| 2010/0067324 A1 | 3/2010 | Preissler |
| 2010/0085214 A1 | 4/2010 | Kim |
| 2010/0134321 A1 | 6/2010 | Kim |
| 2010/0205000 A1 | 8/2010 | Cho |
| 2012/0182160 A1 | 7/2012 | Hod |
| 2014/0005961 A1 | 1/2014 | Hod et al. |

* cited by examiner

ZONE CONTROLLER

CROSS-REFERENCE TO RELATED APPLICATION(S)

This application claims the benefit of U.S. Provisional Application No. 61/738,767, filed Dec. 18, 2012, entitled Zone Controller. The disclosure of the prior application is incorporated herein by reference in its entirety.

BACKGROUND

The present disclosure relates to a zone controller and, more particularly, to a zone controller for a system adapted to monitor the occupancy status of a plurality of parking spaces in a parking facility. The system utilized ultrasonic occupancy sensors. In general, ultrasonic sensors are able to evaluate attributes of a target by interpreting the echoes from ultrasonic waves respectively.

SUMMARY OF THE INVENTION

In one aspect, a method includes transmitting a measurement command from a controller to an occupancy sensor with an address that corresponds to an occupancy sensor identifier. The measurement command causes the occupancy sensor to transmit an ultrasonic signal into a parking space, receive echo signals reflected back to the occupancy sensor, and determine, based on the echo signals, whether the associated parking space is occupied or empty. The method includes subsequently sending a status check to the occupancy sensor and receiving a response that includes the occupancy sensor's determination as to whether the associated parking space is occupied or empty. The method also includes calibrating the occupancy sensors from the controller.

In another aspect, a method includes transmitting a measurement for calibration purposes command to an occupancy sensor at an address in an occupancy sensor identifier. The measurement for calibration purposes command is adapted to cause the occupancy sensor to transmit an ultrasonic signal into an associated one of the plurality of monitored parking spaces in the parking facility, receive a plurality of resulting echo signals reflected back to the occupancy sensor from surfaces in or around the associated parking space, and determine, based on the plurality of resulting echo signals received, a calibration measurement value that corresponds to the associated parking space having a particular status. The method includes starting a timer to count off a predetermined amount of time. If the controller receives a response within the predetermined amount of time, it stores the response in a computer-based memory. Otherwise, if the computer-based controller does not receive a response within the predetermined amount of time, it sets an indication in the computer-based memory that a calibration error has occurred for the occupancy sensor.

Systems and apparatuses are disclosed to implement and facilitate these and other functionalities.

In some implementations, one or more of the following advantages are present.

For example, a controller is provided that controls and coordinates the operations and calibration of occupancy sensors, such as TCS's Single Space Sensors, available from TCS International of Sudbury, Mass. In addition, system data can be provided, for example, on an as needed basis to other system components, such as personal computers and/or electronic traffic signs, which may include, for example a visual map of a parking facility with visual indicators as to where in the parking facility unoccupied parking spaces may be found.

The controller may provide a user-friendly interface for accessing, viewing and/or setting/calibrating system data. The controller may also accommodate a variety of communication technologies to facilitate communications with the occupancy sensors and/or personal computer, and/or electronic sign.

The systems and techniques disclosed herein may make it very easy for a human operator to set up, calibrate and troubleshoot certain aspects of system operations.

The systems and techniques disclosed herein facilitate the transfer of information between system components in a highly-efficient manner.

Other features and advantages will be apparent from the description and drawings, and from the claims.

DETAILED DESCRIPTION

Figure 1:
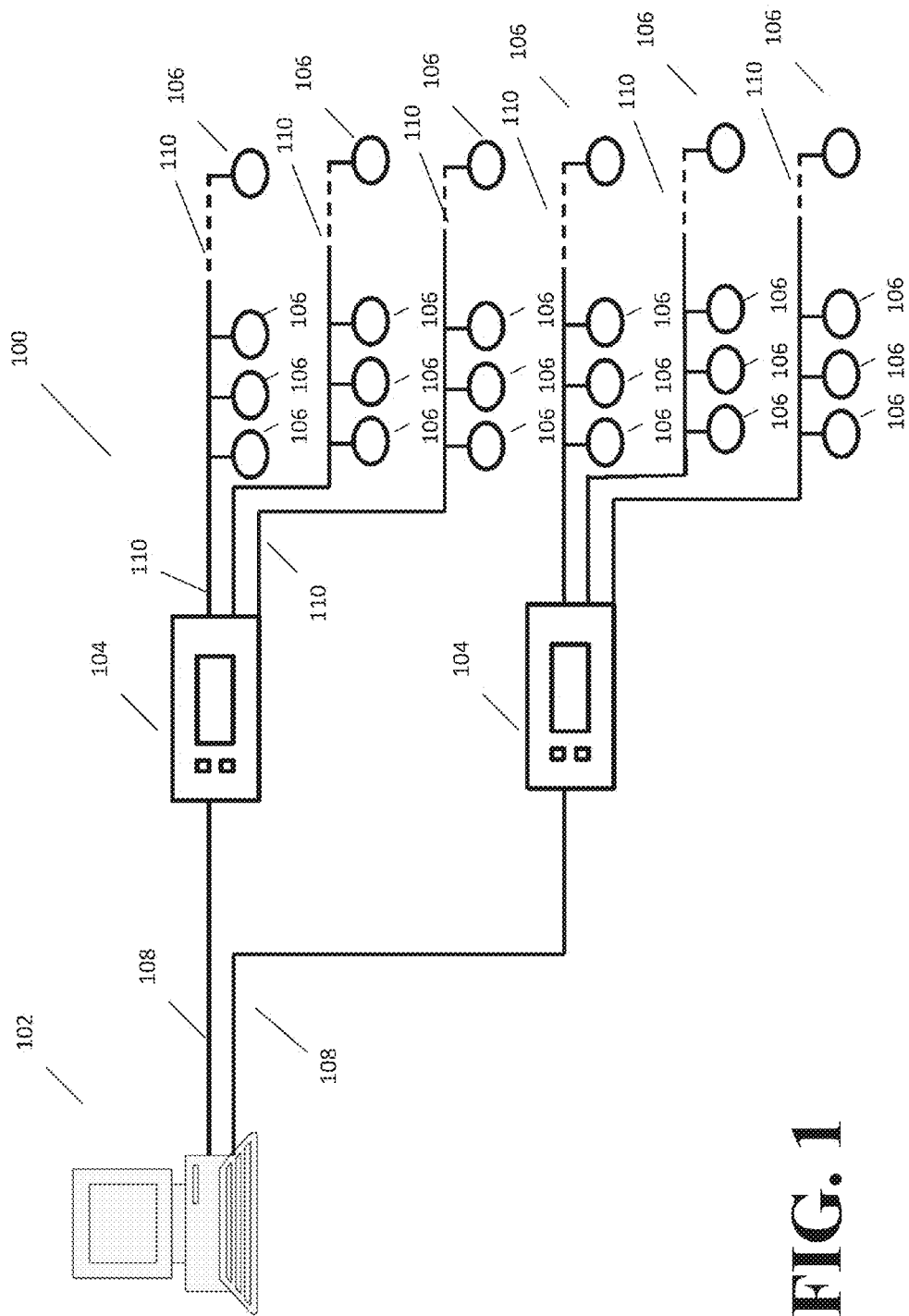
FIG. 1 is a schematic block diagram showing one implementation of a system for monitoring the occupancy status of a plurality of parking spaces in a parking facility.

FIG. 1 is a schematic block diagram showing one implementation of a system 100 for monitoring the occupancy status of a plurality of parking spaces in a parking facility.

The illustrated system 100 includes a personal computer 102, two computer-based controllers (i.e., "zone controllers 104") and a plurality of occupancy sensors 106 positioned at various locations throughout the parking facility. In a typical implementation, each occupancy sensor 106 is installed near a corresponding one of the parking spaces so that it will be able to transmit an electromagnetic signal (e.g., an ultrasonic signal) into the corresponding parking space for occupancy sensing purposes.

The personal computer 102 serves as a user interface to the system 100. In a typical implementation, the personal computer 102 provides a user, such as a system administrator with access to various data and functionality associated with the system 100. Even more particularly, in some implementations, the personal computer 102 is configured to run TCS Visual Control Center software, available from TCS International, Inc. of Sudbury, Mass.

Each zone controller 104 is coupled to the personal computer 102 by a PC communications bus 108 and each zone controller 104 has multiple, separate sensor communication buses 110, each of which is coupled to a plurality of occupancy sensors 106. In a typical implementation, there are three separate sensor communication buses 110 coupled to each zone controller 104 and there are up to thirty-two occupancy sensors 106 coupled to each sensor communication bus 110.

In a typical implementation, each zone controller 104 may be logically associated with a corresponding one of a plurality of physical areas (i.e., zones) in the parking facility. So, for example, each zone controller 104 may be logically associated with one floor in a multi-floor parking facility. In that example, all of the occupancy sensors coupled to a particular zone controller may be located so as to monitor the occupancy status of parking spaces on the associated floor of the parking facility.

In another example, there may be multiple zone controllers 104 associated with a single floor. In that example, each of the zone controllers 104 associated with the single floor may be associated with a particular section (i.e., a zone) of the single floor. For example, there may be four zone controllers 104 associated with the single floor, with one of the zone controllers 104 associated with a northeast section of the floor, a second one of the zone controllers 104 associated with a northwest section of the floor, a third one of the zone controllers 104 associated with a southwest section of the floor and a fourth one of the zone controllers 104 associated with a southeast section of the floor. In that example, the occupancy sensors coupled to each zone controller may be located so as to monitor the occupancy status of parking spaces in the associated section of the floor (e.g., northeast, northwest, southwest and southeast).

A variety of other zone controller and occupancy sensor arrangements are possible.

Each zone controllers 104 is generally operable to facilitate system 100 operations including, for example, operation of the occupancy sensors, communication with the personal computer 102, system setup including occupancy sensor calibration, and manage software and firmware updates.

Figure 2:
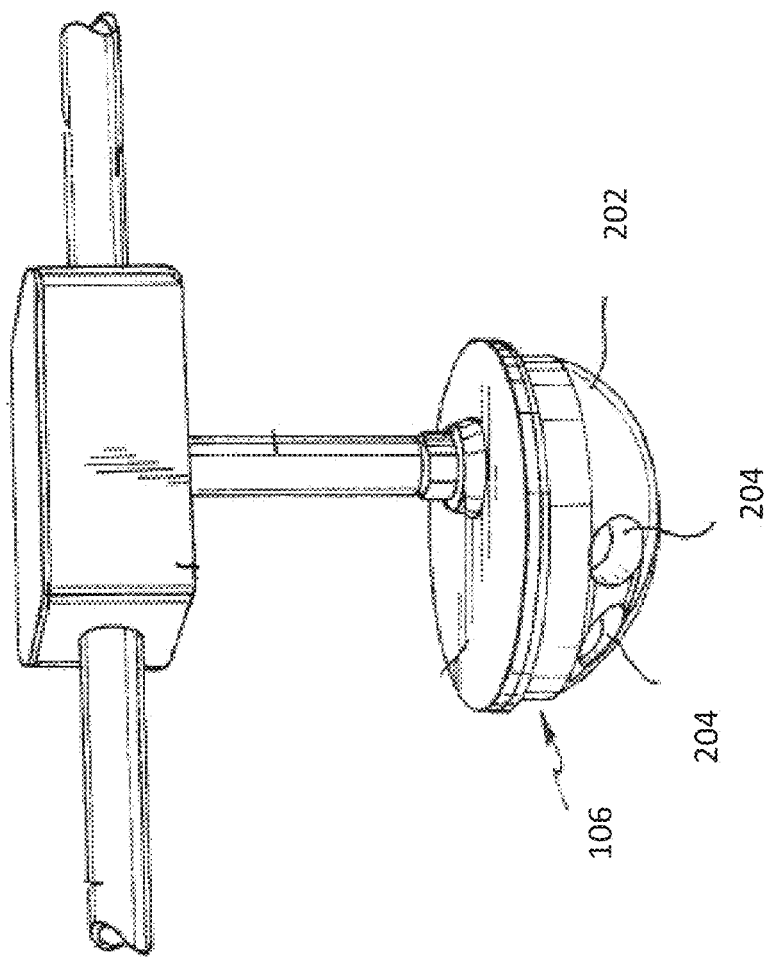
FIG. 2 is a perspective view showing an exemplary implementation of one of the occupancy sensors from FIG. 1.

FIG. 2 is a perspective view showing an exemplary implementation of one of the occupancy sensors 106 from FIG. 1.

The illustrated occupancy sensor 106 is coupled to a conduit system, which is only partially shown in FIG. 2.

The occupancy sensor 106 has a housing 202 and a pair of ultrasonic transceivers 204 that are arranged so that they can transmit and receive ultrasonic signals external to the housing 202. As illustrated, the pair of ultrasonic transceivers is optically exposed through apertures formed in the housing 202.

The ultrasonic transceivers 204 are generally arranged and operable such that, upon prompting, they can transmit an ultrasonic signal into an associated one of the parking spaces in the parking facility and, subsequently receive a plurality of ultrasonic echo signals reflected off of the various surfaces in and around the associated parking space. These surfaces may include, for example, the floor of the parking space, surfaces of an automobile parked in or near the parking space and walls or other parking facility structures near the parking space.

Each occupancy sensor 106 is also generally operable to emit a light that has a different characteristic (e.g., a different color) depending on whether the parking space associated with that occupancy sensor is empty, occupied or otherwise specially designated (e.g., as a reserved parking space for a certain class of drivers, such as drivers with disabilities, diplomats, etc.). According to one such scheme, each occupancy sensor 106 is generally operable to emit a green light to indicate that the associated parking space is empty, a red light to indicate that the associated parking space is occupied and a blue light to indicate that the associated parking space is reserved for a certain class of drivers.

Other lighting color schemes are possible as well.

In a typical implementation, at least part of the housing 202 of the occupancy sensors 106 is transparent or semitransparent to allow differently colored lights inside the housing 202 to be seen, when illuminated, from outside the housing 202. Preferably, each of the different colored lights in an occupancy sensor 106 is sufficiently bright that it can be seen by a driver driving through the parking facility without undue difficulty. For example, in a typical implementation, each of the different colored lights can be seen from the end of a lane of parking spaces in the parking facility so that the driver can readily assess, from a distance, if any parking spaces in that lane may be available (e.g., unoccupied and not otherwise reserved).

In the illustrated implementation, the conduit system supports and carries signal and power wiring to and from the occupancy sensor 106. There are a variety of other ways that the occupancy sensors 106 can be supported and that power and signal wiring can be routed to the occupancy sensors 106.

Figure 3:
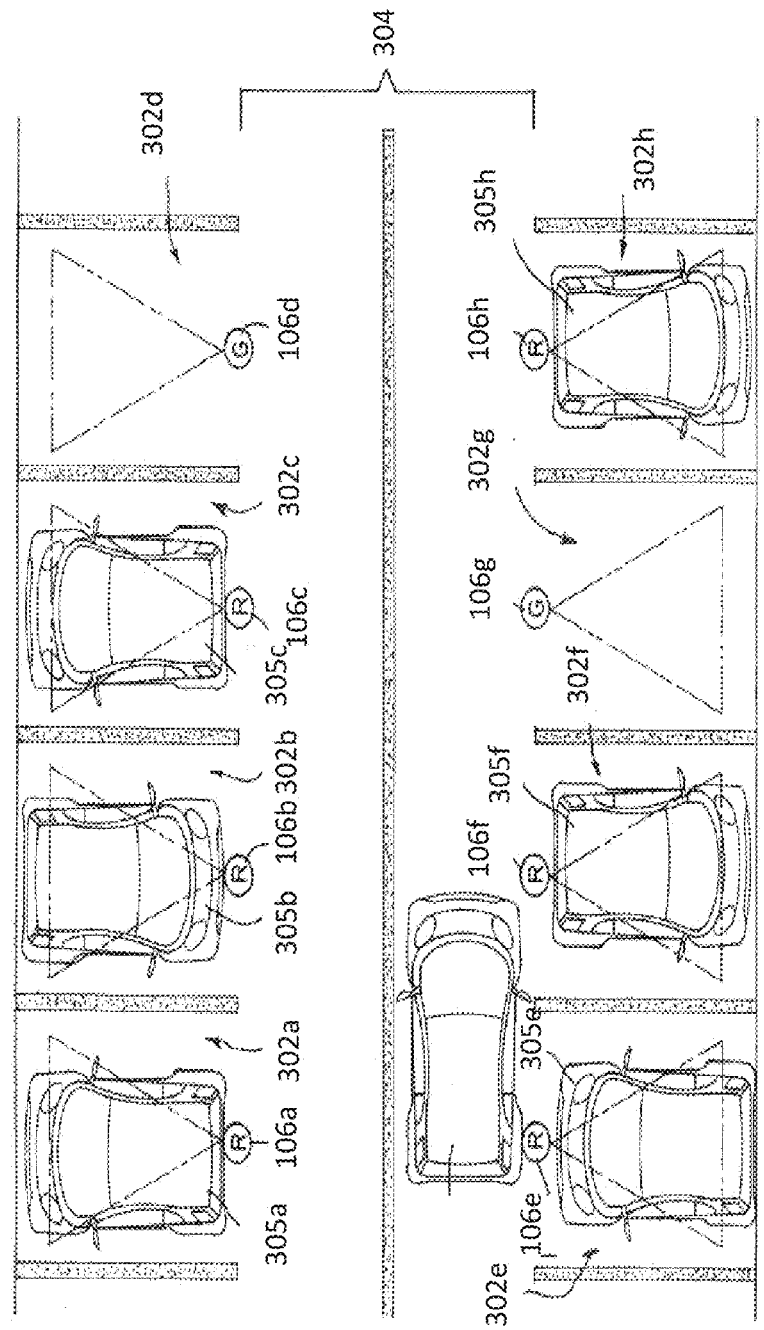
FIG. 3 is a plan view showing a portion of an exemplary parking facility 300 for automobiles.

FIG. 3 is a plan view showing a portion of an exemplary parking facility 300 for automobiles.

The illustrated portion of the parking facility 100 has eight parking spaces 302a-302h and a bi-directional traffic lane 304 that provides access to the parking spaces 302a-302h. Four of the parking spaces 302a-302d are on one side of the bi-directional traffic lane 304 and four of the parking spaces 302e-302h are on an opposite side of the bi-directional traffic lane 304.

In the illustrated example, six of the parking spaces (i.e., 302a, 302b, 302c, 302e, 302f and 302h) are occupied by an automobile (305a, 305b, 305c, 305e, 305f and 305h) and two of the parking spaces (i.e., 302d and 302g) are empty. The parked automobiles (305a, 305b, 305c, 305e, 305f and 305h) are parked in a head-in configuration, side-by-side and substantially perpendicular to the directions of travel in the bi-directional traffic lane 304. Another automobile 305i is within the bi-directional traffic lane 304 and driving left-to-right in the illustrated example.

An occupancy sensor 106a-106h is provided next to each of the parking spaces 302a-302h, respectively. Each occupancy sensor 106a-106h is adapted to monitor the occupancy status (e.g., whether an automobile is parked there or not) of a corresponding one of the parking spaces. For example, occupancy sensor 106a is adapted to monitor the occupancy status of parking space 302a. Likewise, occupancy sensor 106b is adapted to monitor the occupancy status of parking space 302b.

In general, each occupancy sensor 106a-108h is adapted to provide an indication as to the occupancy status of its corresponding parking space 302a-302h. The indication can be any kind of indication that is detectable by a human. Examples include visual indications, audible indications and combined visual and audible indications. In the illustrated implementation, each occupancy sensor 106a-106h is adapted to provide an indication as to the occupancy status of its corresponding parking space 302a-302h by illuminating either a green light to indicate that its monitored parking space is empty or a red light to indicate that its monitored parking space is occupied. More particularly, in the illustrated example, occupancy sensors 106d and 106g are illuminated with a green light to indicate that the corresponding parking spaces are empty and all of the other occupancy sensors are illuminated with a red light to indicate that their corresponding parking spaces are occupied.

In a typical implementation, each occupancy sensor 106a-106h is positioned above the traffic flow in the parking facility 300. For example, in some implementations, the occupancy sensors 106a-106h may be suspended from a conduit system that is hung off the parking facility's ceiling.

In general, each occupancy sensor 106a-106h is positioned so that it can provide an indication (e.g., a visual indication) of occupancy status that is detectable to an automobile driver at just about any point along the bi-directional traffic lane 304, even points that are displaced some distance from the particular monitored parking space in question. More particularly, in the illustrated implementation, each occupancy sensor 106a-106h is positioned near an outer edge of its corresponding monitored parking space. For example, occupancy sensor 106a is positioned near an outer edge of parking space 302a. Similarly, occupancy sensor 106g is positioned near an outer edge of parking space 302g. Therefore, the illumination emitted from these occupancy sensors is easy to see from virtually anywhere along the length of the bi-directional traffic lane 304.

Thus, in the illustrated example, the driver in automobile 305i is able to see quite easily the red or green light being emitted from each of the occupancy sensors 106a-106h along the sides of the bi-directional traffic lane 304. More particularly, the driver is able to see quite easily that occupancy sensors 106d and 106g are green and the rest of the occupancy sensors are red. Therefore, the driver can conclude, therefore, that the parking spaces 302d and 302g corresponding to the green lights on the occupancy sensors 106d, 106g are empty. It is easy, therefore, for the driver to navigate quickly and safely to one of those empty parking spaces 302d and 302g to park.

In a typical implementation, the occupancy sensors 106a-106h monitor the occupancy status of the parking spaces using ultrasonic technology. More particularly, each occupancy sensor 106a-106h is operable such that it transmits, in response to a prompt from its corresponding zone controller, an ultrasonic signal (represented schematically in FIG. 1 as cone) toward its monitored parking space 302a-302h. In general, the occupancy sensor 106a-106h evaluates attributes of its monitored parking space (e.g., whether the parking space is empty or occupied) by interpreting echo signals it receives from the transmitted ultrasonic signals. In addition, in a typical implementation, each zone controller can be calibrated in response to prompts and/or related data it receives from its zone controller.

Since the occupancy sensors 106a-106h in the illustrated implementation are positioned near the outer edges of their corresponding monitored parking spaces 302a-302h, each occupancy sensors 106a-#08h is operable to transmit its ultrasonic signals at an angle that is offset from perpendicular relative to the floor directly below the occupancy sensor 106a-106h. That is, each occupancy sensor 106a-106h transmits its ultrasonic signal from above the traffic flow and near an outer edge of the monitored parking space 302a-302h toward a position in the parking space that would be occupied by an automobile parked there.

The angle at which a particular occupancy sensor will transmit its ultrasonic signal may depend somewhat on the geometry of the installation (e.g., the height of occupancy sensor above the floor, the size of the parking spot being monitored, how near or far from the outer edge of the parking space the occupancy sensor is located, etc.). However, in a typical implementation, the emitting angle is between 10 degrees and 50 degrees from perpendicular (e.g., between 20 degrees and 40 degrees from perpendicular or about 30 degrees from perpendicular).

Since the occupancy sensors 106a-106h transmit the ultrasonic signals at an angle, rather than straight down for example, the transmitted ultrasonic signals tend to scatter in a variety of directions after contacting an object, such as an automobile or the floor of the parking facility, with relatively few echo signals returning to the occupancy sensor, even when the corresponding parking space is occupied.

The various occupancy sensors in a particular facility may be connected to one or multiple different zone controllers.

Figure 4:
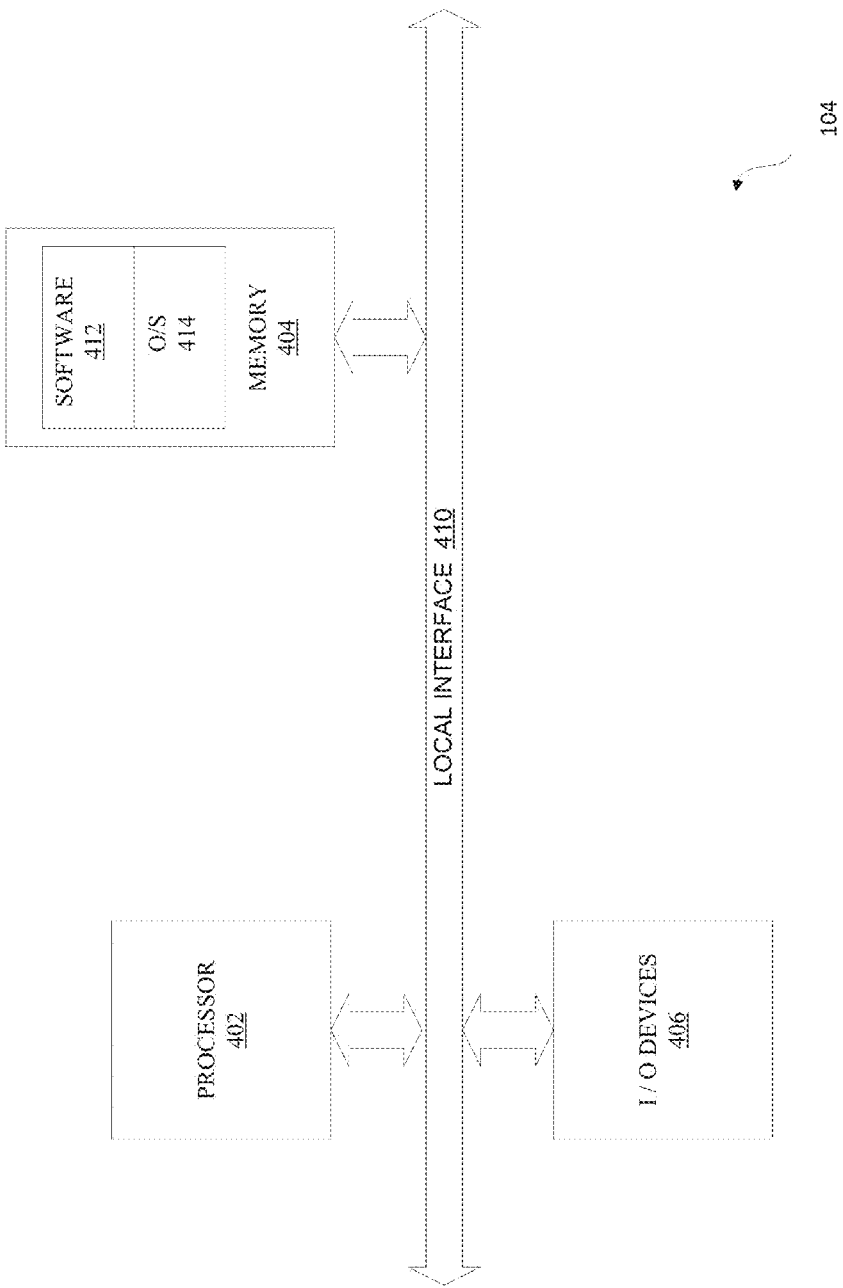
FIG. 4 is a block diagram illustrating one example of the zone controller in the system of FIG. 1.

FIG. 4 is a block diagram illustrating an example of one of the zone controllers 104 in the system 100 of FIG. 1.

According to the illustrated implementation, the zone controller 104 includes a processor 402, memory 404 and one or more input and/or output (I/O) devices 406 (or peripherals) that are communicatively coupled via a local interface 410. The local interface 410 can be, for example, one or more buses or other wired or wireless connections. The local interface 410 may have additional elements as well including, for example, controllers, buffers (caches), drivers, repeaters, receivers, counters, timers, and the like to enable or facilitate communications between the various components inside and external to the zone controller 104. Further, the local interface 410 may include address, control, and/or data connections to enable appropriate communications among the aforementioned components.

The processor 402 is a hardware device for executing software, for example, software that may be stored in the memory 404. The processor 402 can be any general purpose or custom made, commercially available processor, a central processing unit (CPU), an auxiliary processor, a semiconductor based microprocessor (in the form of a microchip or chip set), a macroprocessor, or generally any device for executing software instructions and/or processing data.

The memory 404 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 404 can incorporate electronic, magnetic, optical or other types of storage media. The memory 404 can have a distributed architecture, where various components of the memory are situated remotely from one another, but can all be accessed by the processor 402.

The memory 404 in the illustrated implementation is storing software 412 and an operating system 414. In a typical implementation, the memory 404 also stores other data and information to support and facilitate one or more of the zone controller functionalities disclosed herein.

The software 412 can include one or more separate programs, each of which contains an ordered listing of executable instructions for implementing logical functions of the zone controller 104, as described herein. In a typical implementation, the operating system 414 controls the execution of computer programs and provides scheduling, input-output control, file and data management, memory management, and communication control and related services.

The zone controller 104 functionality can be implemented based on a source program, executable program (object code), script, or any other set of instructions to be performed.

The I/O devices 406 can include one or more input devices such as a touch screen, buttons, a keyboard/keypad, mouse, scanner, microphone, or other input device. The I/O devices 406 can include one or more output devices such as a display screen, a touch screen, speaker, or other output device. The I/O devices 406 can include devices that facilitate communication over both input and output ports including, for example, a modulator/demodulator (modem; for accessing another device, system, or network), a radio frequency (RF) module, a wireless module, a transceiver, a telephonic interface, a bridge, a router, or other devices that function both as an input device and/or an output device.

When the zone controller 104 is in operation, the processor 402 is configured to execute the software 412 stored in the memory 404, to communicate data to and from the memory 404, and to generally control operations of the zone controller 104 pursuant to the instructions stored in the memory 404. Instructions contained in the software 412 and/or the O/S 414 are generally read by and executed by the processor 402.

The zone controller 104 also has communication ports 416. In general, the communication ports 416 facilitate communications between the zone controller 104 and the occupancy sensors and between the zone controller 104 and the PC. The communication ports 416 may be capable of communicating using different communication protocols at each port. For example, in some implementations, the communication protocol used to communicate with the occupancy sensors may be different than the communication protocol used to communicate with the PC.

Figure 5:
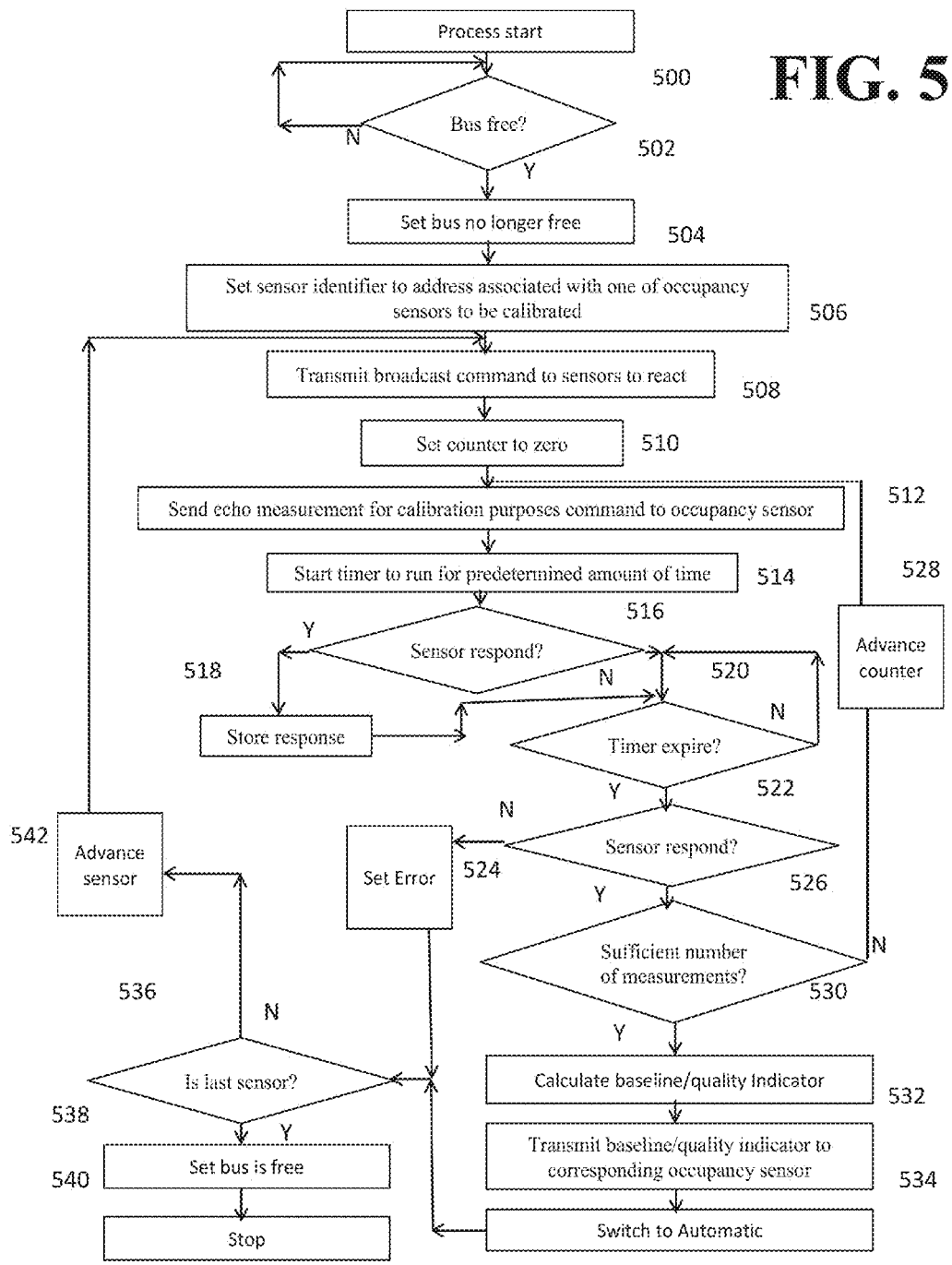
FIG. 5 is a flowchart showing an exemplary process by which a zone controller can calibrate a group of occupancy sensors that are connected to one of its sensor communication buses.

FIG. 5 is a flowchart showing an exemplary process by which a zone controller 104 can calibrate a group of occupancy sensors that are connected to one of its sensor communication buses.

In a typical implementation, the occupancy sensors 106 are calibrated when their corresponding parking spaces are empty. As discussed below in detail, the calibration process generally involves establishing a baseline echo measurement value that represents an empty parking space and that can be used subsequently to determine whether the corresponding parking space is empty or occupied.

The illustrated process begins at 500. At 502, the zone controller 104 checks whether the sensor communication bus 110 for the sensors that are to be calibrated is free (i.e., available or not already being used in connection with some other system functionality). The zone controller does not proceed to the next step in the illustrated method unless (or until) the sensor communication bus 110 in question is free.

At 504, the zone controller 104 sets an indication that, for the time being, the sensor communication bus 110 will no longer be free. This indicates to other system components that the sensor communication bus 110 in question is being used; more particularly, it is being used for sensor calibration purposes. In general, the sensor communication bus 110 in question remains in use (i.e., not free) until the zone controller 104 completes the illustrated calibration process and frees up the sensor communication bus 110 (at 538) for use in connection with other system resources and functionalities.

At 506, the zone controller 104 sets a sensor identifier to an address associated with a first one of the occupancy sensors 106 to be calibrated.

At 508, the zone controller 104 transmits a broadcast command onto the sensor communication bus 110 in question to cause all of the occupancy sensors 106 on that sensor communication bus 106 to react to the transmission. In a typical implementation, the reaction is a physical one that conveys to a human operator that the transmission has been received. In some implementations, the occupancy sensors 106 react to the broadcast command by emitting a blinking light (e.g., a red blinking light).

At this point, a human operator can confirm, by visually inspecting all of the occupancy sensors 106 on the sensor communication bus 110 in question, that the zone controller 104 successfully communicated the broadcast command to all of the occupancy sensors 106. If, for example, all of the occupancy sensors 106 on the sensor communication bus 110 in question are emitting a blinking red light, then the human operator can conclude that the broadcast transmission was successful and that all of the corresponding occupancy sensors 106 reacted appropriately. If, on the other hand, one or more of the occupancy sensors are not emitting a blinking red light, then the human operator can conclude that there is some problem with the system 100 that needs correcting.

There are a variety of potential problems that could be causing one or more of the occupancy sensors 106 to not be emitting a blinking red light after the broadcast command is transmitted. For example, the problem could be that the zone controller 104 did not properly transmit the broadcast command, or that the broadcast command did not reach one or more of the occupancy sensors, or that a problem exists with the non-blinking occupancy sensors. If the human operator concludes that some problem exists (because one or more of the occupancy sensors is not emitting a blinking red light), he or she can take steps to rectify whatever the problem may be so that subsequently, all occupancy sensors will be able to be calibrated.

At 510, the zone controller 104 sets a counter to zero (0). In general, the counter keeps track of how many calibration measurements have been taken at a particular one of the occupancy sensors 106. In general, the zone controller 104 is configured to trigger a certain predetermined number of calibration measurements for each one of the occupancy sensors 106. According to the illustrated implementation, thirteen (13) calibration measurements are taken for each one of the occupancy sensors 106. Therefore, the value in the counter is advanced one unit after each calibration measurement is taken until the counter value reaches a value of twelve (12).

At 512, the zone controller 104 sends a command to whichever occupancy sensor 106 corresponds to the address currently stored in the sensor identifier. The command is to perform an echo measurement for calibration purposes.

In a typical implementation, when an occupancy sensor 106 receives such a command, it transmits an ultrasonic signal into the corresponding parking space, and receives a plurality of echo signals reflected back to the occupancy sensor 106 from a plurality of surfaces in or around the parking space. To produce a calibration measurement value, the occupancy sensor 106, in some implementations, integrates the echo signals it receives over some predetermined period of time in response to a single ultrasonic signal transmission. The result of the integration can be considered a calibration measurement value.

At 514, the zone controller 104 starts a timer to run for a certain predetermined amount of time. In the illustrated example, that certain predetermined amount of time is 120 milliseconds. This is intended to be an amount of time by which the occupancy sensor 106, if it is going to respond, should have responded.

If the timer expires (at 520) and the occupancy sensor 106 has not yet responded, then the zone controller 104 (at 524) sets an error message for that occupancy sensor 106. The error message provides an indication to a human operator or to other system components (e.g., the PC 102) that the occupancy sensor 106 in question did not respond to the measurement command from the zone controller 104 and that, therefore, the occupancy sensor 106 in question has not yet been calibrated.

If the sensor (at 516) does respond before the timer expires (at 520), the zone controller 104 (at 518) stores the response in a memory storage device (e.g., memory 304). The stored response typically includes the calibration measurement value as determined by the occupancy sensor 106 in question and can include additional data related to the calibration measurement value, as well.

The zone controller 104 then considers (at 526) whether the occupancy sensor 106 in question has conducted a sufficient number of calibration measurements (i.e., whether the predetermined number of calibration measurements have been taken) to accurately set a calibration baseline for that occupancy sensor 106. According to the illustrated implementation, thirteen (13) calibration measurements should be taken for each occupancy sensor 106. Therefore, at 526, the zone controller 104 considers whether the value in the counter, which generally advances from an initial value of zero (0) one unit after each calibration measurement is taken, has reached twelve (12).

If the zone controller 104 determines (at 526) that the value in the counter has not yet reached twelve (12), then it advances the value in the counter (at 528) by one unit (e.g., from zero (0) to one (1)) and returns to step 512 in the illustrated process and sends another command to occupancy sensor 106 in question to perform an echo measurement for calibration purposes.

If the zone controller 104 determines (at 526) that the value in the counter has reached twelve (12), then the zone controller 104 calculates (at 530) a baseline echo measurement vale and an optional a quality indicator.

In general, the baseline echo measurement value is an echo measurement value that corresponds to the parking space for a particular occupancy sensor 106 being empty and that can be used subsequently by the particular occupancy sensor 106 for comparison purposes to determine whether the corresponding parking space is empty or occupied.

In general, the baseline echo measurement value is calculated based on one or more of the plurality of calibration measurement values that the zone controller 104 receives from the particular occupancy sensor 106. In the illustrated example, the baseline echo measurement value would be calculated based on thirteen (13) calibration measurement values.

The baseline echo measurement value can be calculated using any one of a variety of different techniques. According to one such technique, the zone controller 104 simply identifies which value appeared the most among the calibration measurement values received from the particular occupancy sensor 106. That value is treated as the baseline echo measurement value.

In some implementations, if the zone controller 104 is implementing this technique, there may be a minimum number of times that the value needs to have appeared among the calibration measurement values in order to qualify to be considered the baseline echo measurement value. For example, the value may need to have appeared in at least six (6) of the thirteen (13) calibration measurement values in order for it to qualify to be considered the baseline echo measurement value. In situations where there is no one value that appeared more than the minimum number of times to qualify, then the zone controller 104 may either prompt the occupancy sensor 106 to produce a second round of calibration measurement values or set an error message for that occupancy sensor 106 indicating that an attempted calibration has been unsuccessful.

Other techniques may be implemented by the zone controller 104 to calculate the baseline echo measurement value. For example, the zone controller 104 may calculate the average or mean value of the calibration measurement values it receives from the occupancy sensor and use the average or mean value as the baseline echo measurement value.

In general, the quality indicator provides a measure of the quality of the baseline echo measurement value. The quality indicator can be calculated using any one of a variety of different techniques. According to one such technique, the zone controller 104 assigns a grade based on some metric associated with the baseline echo measurement value and/or the calibration measurement values used to calculate the baseline echo measurement value. For example, the zone controller 104 may assign a grade to the baseline echo measurement value based on how many of the calibration measurement values were the same as the baseline echo to measurement value.

So, according to one such grading scheme, if less than 50% of the calibration measurement values were the same as the baseline echo measurement value, then the zone controller 104 might assign a grade of "F" as the quality indicator, indicating low quality; if between 50% and 70% of the calibration measurement values were the same as the baseline echo measurement value, then the zone controller 104 might assign a grade of "R" as the quality indicator, indicating a slightly higher quality; if between 70% and 90% of the calibration measurement values were the same as the baseline echo measurement value, then the zone controller 104 might assign a grade of "Y" as the quality indicator, indicating an even higher quality; and if between 90% and 100% of the calibration measurement values were the same as the baseline echo measurement value, then the zone controller 104 might assign a grade of "G" as the quality indicator, indicating the highest possible quality.

In a typical implementation, if the quality indicator indicates a quality that falls below some threshold value (e.g., having a grade of "F" or "R"), then the zone controller 104 may either prompt the occupancy sensor 106 to produce a second round of calibration measurement values and attempt to calculate a new baseline echo measurement value and corresponding quality indicator or set an error message for that occupancy sensor 106 indicating that an attempted calibration has been unsuccessful.

At 532, the zone controller 104 transmits the calculated baseline echo measurement value and optionally the quality indicator to the corresponding occupancy sensor 106. In a typical implementation the zone controller 104 accompanies this information with a command for the corresponding occupancy sensor 106 to set the transmitted baseline echo measurement value as a baseline value to use in connection with subsequent occupancy determinations. In a typical implementation, the occupancy sensor 106, when it receives this information (and command) from its zone controller 104, stores the transmitted information for future use.

The zone controller 104, at 534, then sends a command to the corresponding occupancy sensor 106 to switch to its LEDs to automatic mode. In automatic mode, the LEDs in the occupancy sensor 106 illuminate according to the latest sensed occupancy status of its parking space.

After setting the occupancy sensor 106 to automatic mode (at 534) or after setting an error message for the occupancy sensor 106 indicating that the occupancy sensor 106 has not yet been calibrated (at 524), the zone controller 104 considers (at 536) whether there are any other sensors on the sensor communication bus 110 under consideration that still need to be calibrated.

If the zone controller 104 determines (at 534) that there are no more occupancy sensors 106 on the sensor communication bus 110 that need to be calibrated, then the zone controller 104 (at 538) sets an indication that the sensor communication bus 110 is free (i.e., free for use by in connection with other system resources or functionalities). The zone controller 104 then stops the calibration process for that sensor communication bus 110 (at 540).

If, on the other hand, the zone controller 104 determines (at 534) that there are more occupancy sensors 106 on the sensor communication bus 110 that need to be calibrated, then the zone controller 104 (at 542) advances the sensor identifier to an address associated with the next one of the occupancy sensors 106 to be calibrated. The zone controller 104 then returns to step 508 in the illustrated process.

In a typical implementation, each zone controller 104 in the system calibrates all of its occupancy sensors 106 according to the illustrated process. Once calibrated, the occupancy sensors generally enter automatic mode, in which their LEDs illuminate according to the latest sensed occupancy status of each parking space, respectively.

Figure 6:
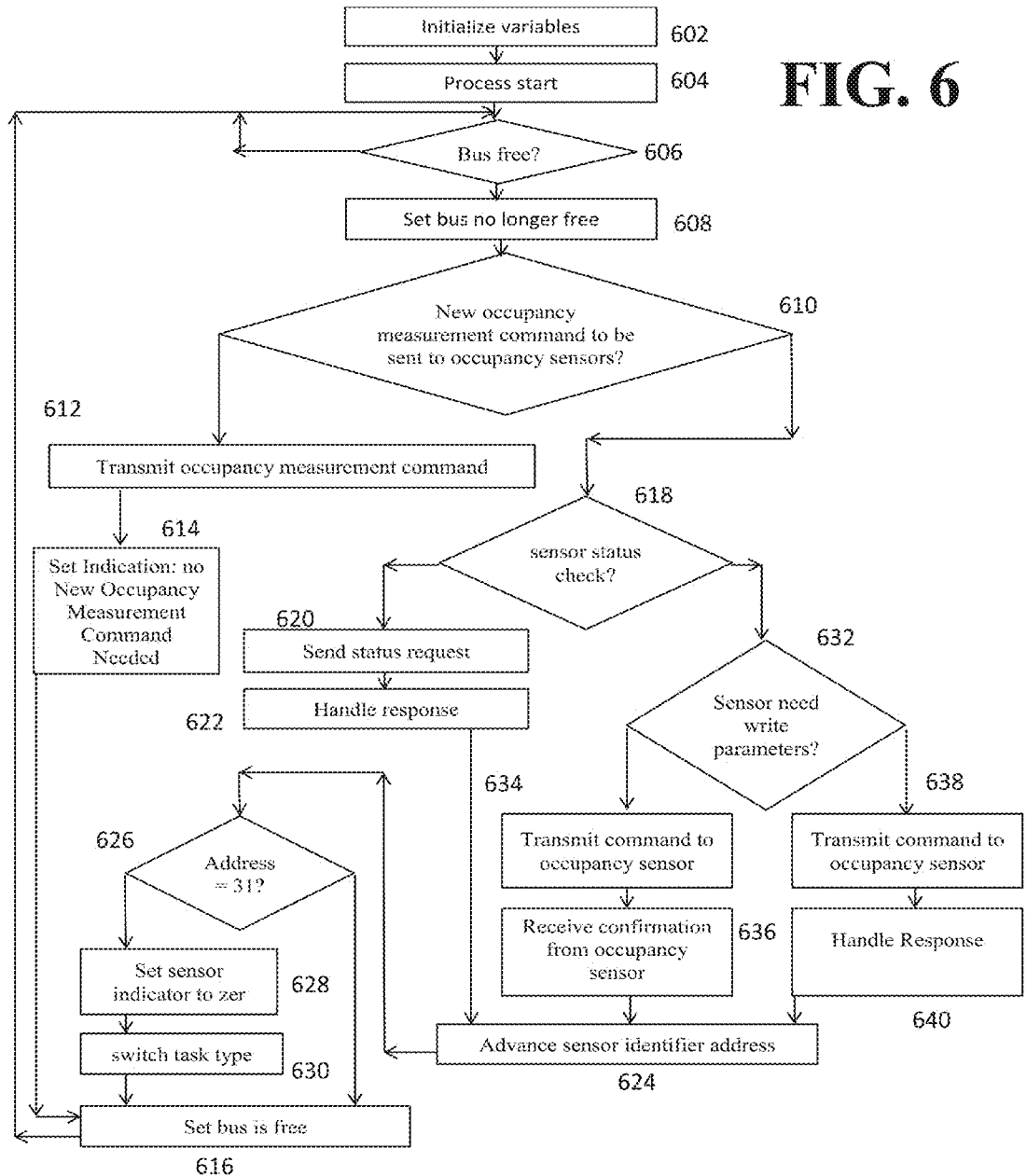
FIG. 6 is a flowchart showing an exemplary process by which a zone controller directs normal operations of the occupancy sensors connected to one of its sensor communication buses.

FIG. 6 is a flowchart showing an exemplary process by which a zone controller 104 directs normal operations of the occupancy sensors 106 connected to one of its sensor communication buses 110.

According to the illustrated process, the zone controller 104 (at 602) initializes all variables associated with the process and starts the process (at 604).

At 606, the zone controller 104 checks whether the sensor communication bus 110 in question is free. If not, then the zone controller 104 waits before proceeding until the sensor communication bus 110 in question is free.

Once the sensor communication bus 110 in question is free, the zone controller 104 (at 608) sets an indication that the sensor communication buses 110 connected to the zone controller 104 will no longer be free. This indicates to other system components that the sensor communication buses 110 in question are being used; more particularly, they are being used for in connection with normal operation of the occupancy sensors. In general, the sensor communication buses 110 in question remains in use (i.e., not free) until the zone controller 104 completes the illustrated process and frees up the sensor communication buses 110 (at 616) for use in connection with other system resources and functionalities.

At 610, the zone controller 104 checks to see if a new command is to be sent to the occupancy sensors 106 that are connected to the sensor communication buses 110 for that zone controller 104. In some implementations, the zone controller 104 has an internal indicator that indicates can indicate at different times that either a new command is to be sent or that a new command is not to be sent.

If the zone controller 104 determines (at 610) that a new command is to be sent to the occupancy sensors 106, then (at 612) the zone controller transmits the command to the occupancy sensors 106 connected to its sensor communication buses 110 to transmit an ultrasonic signal into its corresponding parking spot to initiate a measurement cycle. In a typical implementation, the command is transmitted as a broadcast command, substantially simultaneously to every one of the occupancy sensors 106 connected to the zone controller's sensor communication buses 110.

If a system includes multiple zone controllers 104, then all of the zone controllers 104 may be coordinated to send out similar broadcast commands at the same time so that all of the occupancy sensors 106 in the system initiate a measurement cycle at substantially the same time. This type of coordination may, in some instances, help reduce the likelihood that different results are produced in sequential measurement cycles by the same occupancy sensor 106 when there hasn't been an actual change in occupancy status of the corresponding parking space.

In a typical implementation, each occupancy sensor 106 is configured such that when it receives a command from its zone controller to initiate a measurement cycle, the occupancy sensor transmits an ultrasonic signal into the corresponding parking space, and receives a plurality of echo signals reflected back to the occupancy sensor 106 from a plurality of surfaces in or around the parking space (or on a vehicle or other object in the parking space). To produce an occupancy measurement value, the occupancy sensor 106, in some implementations, integrates the echo signals it receives over some predetermined period of time in response to a single ultrasonic signal transmission. The result of the integration can be considered an occupancy measurement value.

When (or shortly after) the zone controller 104 transmits the occupancy measurement command (at 612) to its occupancy sensors 106, the zone controller 104 sets an indication (at 614) that an occupancy measurement command—for the time being—no longer needs to be sent. This is because an occupancy measurement command just was sent.

At 616, the zone controller 104 sets an indication that the sensor communication buses 110 connected to the zone controller 104 are once again free (i.e., free for use by other system resources or in connection with other system functionalities).

The zone controller 104 then returns to step 606 in the illustrated process. If (at 606), the zone controller 104 determines that the sensor communication buses 110 are free (i.e., no other system resources or system functionalities are occupying the zone controller's sensor communication buses 110), then the zone controller again (at 608) sets an indication that the sensor communication buses 110 connected to the zone controller 104 are no longer be free and checks (at 610) to see if a new occupancy measurement command is to be sent to the occupancy sensors 106 that are connected to its sensor communication buses 110. In this example, since the zone controller 104 (at 614) set an indication that an occupancy measurement command—for the time being—no longer needs to be sent, the zone controller 104 proceeds to step 618 in the illustrated process.

At 618, the zone controller 104 checks if there is an indication set that a sensor status check is needed. A sensor status check is a check conducted by the zone controller 104 of the occupancy status of its connected occupancy sensors 106. In general, if the occupancy sensors 106 for a zone controller 104 are operational and have been calibrated, and the zone controller 104 has transmitted a broadcast command to its occupancy sensors 106 to conduct an occupancy measurement, but has not yet received a response, then the zone controller (at 618) will usually determine that a sensor status check should be performed.

If the zone controller 104 determines (at 618) that a sensor status check should be performed, then it sends a status request (at 620) to a first one of its occupancy sensors 106 at a first address.

In a typical implementation, when an occupancy sensor receives a status request from its zone controller 104, it responds by sending to the zone controller information related to its latest status (as determined, for example, based on the occupancy measurement cycle performed by the occupancy sensor). This information can include, for example, the occupancy status itself and, optionally, other information related to the underlying data used to determine the occupancy status (e.g., the occupancy measurement value, information about the echo signals received in response to the latest ultrasonic transmission, etc.).

The zone controller 104 (at 622) handles the response it receives from the first one of the occupancy sensors 106. In a typical implementation, handling the response may include storing the response in a memory storage unit (e.g., memory 304) and/or sharing the information or otherwise making the information available for accessing to the PC 102.

At 624, the zone controller 104 advances a sensor identifier to point to an address associated with another one of the occupancy sensors 106 whose status is to be checked. In general, the sensor identifier counts from 0 to 31 for each sensor communication bus, advancing by one, to enable the zone controller to individually poll each of its occupancy sensors 106 on a particular sensor communication bus 110 for a status request.

At 626, the zone controller 104 checks if the sensor identifier has a value of 31, which would indicate that all thirty-two (32) of the occupancy sensors 106 on the particular sensor communication bus 110 have been polled.

If the zone controller 104 determines (at 626) that the sensor identifier value is not 31 (or that all of the occupancy sensors 106 connected to the sensor communication bus 110 in question have not yet been polled), then the zone controller 104 once again sets an indication (at 616) that the sensor communication buses 110 connected to the zone controller 104 are once free (i.e., free for use by other system resources or in connection with other system functionalities) and returns to step 606 in the illustrated process.

If the zone controller 104, on the other hand, determines (at 626) that the sensor identifier value is 31 (or that all of the occupancy sensors 106 connected to the sensor communication bus 110 in question have been polled), then the zone controller 104 (at 628) resets the sensor indicator value to zero (0) and switches task type (at 630). In general, since all of the occupancy sensors 106 connected to the sensor communication bus 110 in question have been polled, the task type is changed so that the zone controller 104 no longer indicates that a sensor status check is needed.

The zone controller 104 then sets an indication (at 616) that the sensor communication buses 110 connected to the zone controller 104 are free (i.e., free for use by other system resources or in connection with other system functionalities) and returns to step 606 in the illustrated process.

Since all of the occupancy sensors 106 connected to the sensor communication bus 110 in question have been polled and the task type has been changed to no longer indicate that a sensor status check is needed, when the zone controller 104 reaches step 618, it will determines that a sensor status check is not needed. After making this determination, the zone controller 104 proceeds to step 632 and considers whether the occupancy sensor that corresponds to the address in the sensor identifier needs to write parameters.

If the zone controller 104 determines (at 632) that the occupancy sensor that corresponds to the address in the sensor identifier needs to write parameters, the zone controller 104 transmits (at 634) an appropriate command to the occupancy sensor 106 and receives (at 636) a confirmation from the occupancy sensor 106.

If, on the other hand, the zone controller determines (at 632) that the occupancy sensor that corresponds to the address in the sensor identifier does not need to write parameters, the zone controller 104 transmits (at 638) an appropriate command to the occupancy sensor 106 and handles the response (at 640).

The zone controller 104 then proceeds to step 624 and continues with the process as indicated.

Figure 7:
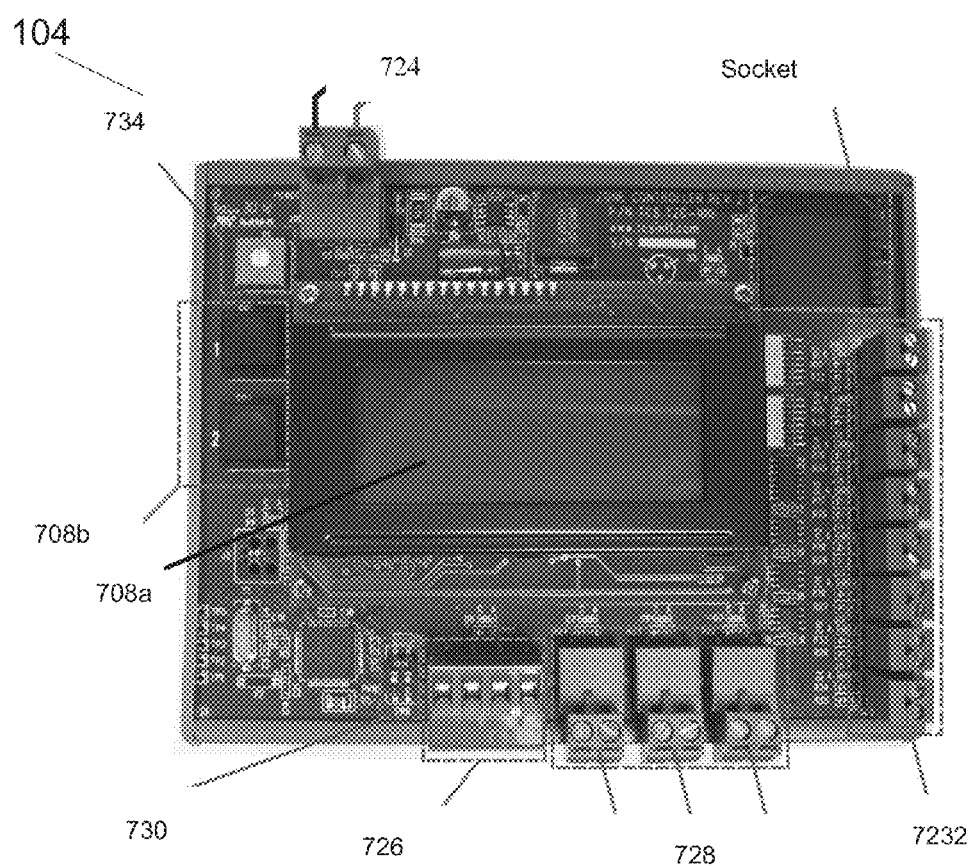
FIG. 7 is an exemplary, schematic circuit layout for one of the zone controllers in the system of FIG. 1.

FIG. 7 is a circuit layout showing an exemplary implementation showing parts of one of the zone controllers 104 from FIG. 1.

The illustrated zone controller 104 has a display screen 708a as an I/O device. In some implementations, the display screen 708a is an intelligent, 4 row by 16 column liquid crystal display (LCD) screen. The display screen 708a is generally operable to present information for viewing by a human operator regarding the system 100 and interactive menus as described herein.

A pair of push buttons 708b is also provided as an I/O device. The push buttons 708b are configured such that they can be manipulated by a human operator to navigate through the interactive menu(s) presented at the display screen 708a and/or to select various options that are presented at the display screen 708a.

The zone controller 104 has a computer-based processor to support and/or facilitate various functionalities of the zone controller 104 disclosed herein. The zone controller 104 also has other circuitry and memory chips that interact with and support the computer-based processor to facilitate the functionalities of the zone controller 104 disclosed herein as well.

The zone controller has a screen brightness adjustment means 734 that can be manipulated by a human operator to adjust the brightness of the display screen 708a. In some implementations, the screen brightness adjustment means is a knob or the like.

The zone controller has a power input terminal block 724, an external communication terminal block 726 and three sensor communication terminal blocks 728.

In a typical implementation, the power input terminal block 724 is configured to receive electrical power to support operations of the zone controller 104. In a particular implementation, the power input terminal block 724 is connected to receive an external 24 volt DC voltage source.

In a typical implementation, each of three sensor communication terminal blocks 728 is connected to an associated one of the sensor communication buses 110. In a typical implementation, the zone controller 104 is configured to accommodate RS485 communications through each of the sensor communication terminal blocks 728. The three sensor communication terminal blocks 728 are connected to or collectively form part of the communication ports 316 in FIG. 3.

In a typical implementation, the external communication terminal block 726 is connected to the PC 102 and/or to one or more of the other zone controllers 104 in the system 100. The external communication terminal block is connected to and/or forms part of the communication ports 316 in FIG. 3.

There is a DIP (dual inline package) switch 730 package (e.g., with two switches) that can be manipulated by a human operator to set the type of communication that will be accommodated over the external communication terminal block 726. In one implementation, for example, positioning the DIP switch in a first configuration (e.g., switches 1 and 2 OFF) sets the zone controller 104 to accommodate RS422 communications at the external communication terminal block 726, whereas positioning the DIP switch in a second configuration (e.g., switches 1 and 2 ON) sets the zone controller 104 to accommodate RS485 communications at the external communication terminal block 726.

The zone controller 104 has eight inputs 732 for zone counting.

The illustrated zone controller 104 has various other components that facilitate the various aspects of the functionalities disclosed herein, including a socket in the upper right corner of the illustrated layout for an optional wireless mesh modem for external communication to zone controllers.

A number of embodiments of the invention have been described. Nevertheless, it will be understood that various modifications may be made without departing from the spirit and scope of the invention.

For example, the techniques and systems disclosed herein could be applied to occupancy sensing applications outside of automobile parking facilities.

The specific components or combination of components in a particular system can vary considerably. For example, in some implementations, a system will not include a personal computer connected to the zone controllers. In some instances, the personal computer may be replaced with an electronic sign that presents information to a human viewer in the parking facility about the occupancy status of the different parking spaces throughout the parking facility.

In such instances, the sign may retrieve information from each of the zone controllers about the occupancy status of the parking spaces throughout the facility. In such instances, the zone controllers may be adapted to set an indicator for the sign to notice whenever the zone controller becomes aware of a change in status. In those instances, the sign would only retrieve new information for a particular parking space if the zone controller has indicated a change in status since the last information retrieval for that parking space.

A personal computer attached to the zone controllers may manage updates from the zone controllers in the same manner.

A system may include any number of occupancy sensors (typically one per parking space), any number of zone controllers (typically at least one zone controller is provided for every 96 occupancy sensors in a facility) and any number of personal computers or parking signs.

Communication between the various components can be implemented using wired or wireless technologies or combinations or wired and wireless technologies.

The specific physical design, arrangement, layout and functionalities associated with each system component can vary as well. For example, the zone controllers may have other hardware or software to implement one or more other functionalities associated with system operations not specifically mentioned herein. Additionally, the circuitry in a zone controller can include more or less physical components than described herein.

The techniques implemented by the zone controller are not limited to the specific techniques described herein. In some implementations, the steps described can be performed in a different order than described herein. In some implementations, certain steps can be performed simultaneously. And, in some implementations, certain steps may be omitted entirely. Some of the steps described may be performed automatically (i.e., without external prompting) and some of the steps described may be performed in response to a prompt by a human operator.

In various implementations, the instructions contained in the software 312 may have been loaded into the memory 304 from an external source, such as from a non-transitory, computer readable medium. The computer readable medium can be any one of an electronic, magnetic, optical, or other physical device or means that can contain or store a computer program for use by or in connection with a computer related system or method. The computer readable medium can be, for example, an electronic, magnetic, optical, electromagnetic, infrared, or semiconductor system, apparatus, device, or propagation medium. More specific examples of the computer-readable medium include an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

The zone controller or PC can include a storage device, including a stationary storage device or portable storage device. As an example, the storage device may be a magnetic tape, disk, flash memory, volatile memory, or a different storage device. In addition, the storage device may be a secure digital memory card or any other removable storage device. The storage device may facilitate loading information, software, etc. into the zone controller's memory.

Although the processes disclosed handle one sensor at a time (e.g., when calibrating), in some implementations, the controller can transmit a broadcast command to more than one (e.g., all) of the occupancy sensors coupled to it to emit ultrasonic signals into every monitored parking space for calibration. Similarly, when attempting determine the status (e.g., occupied or empty) of the parking spaces, the controller can transmit a broadcast command to more than one (e.g., all) of the occupancy sensors coupled to it to emit ultrasonic signals into every monitored parking space for status updating purposes.

Although the techniques disclosed herein generally begin with the controller waiting for the required buses to be free, in some implementations, the controller may have authority to interrupt ongoing processes in order to calibrate or obtain an updated status on one or more of the corresponding occupancy sensors.

Some systems may include multiple controllers and, in those systems, the multiple controllers can be adapted to coordinate timing, etc. with one another.

The controller may interact with the occupancy sensors in a variety of other ways (e.g., causing their light emitting diodes to blink or illuminate in various colors to indicate one or more conditions).

The controller may be adapted to allow a personal computer to initiate a firmware upgrade for one or more occupancy sensors. Generally, the processes involving the other occupancy sensors (i.e., those not affected by the upgrade) will not be interrupted by the firmware upgrade.

Other implementations are within the scope of the claims.

What is claimed is:
1. A method comprising:
transmitting a measurement command from a computer-based controller to a selected one of a plurality of occupancy sensors, wherein the selected one of the occupancy sensors has an address that corresponds to an address in an occupancy sensor identifier,
wherein the measurement command is adapted to cause the occupancy sensor to transmit an ultrasonic signal into an associated one of a plurality of monitored parking spaces in a parking facility, receive a plurality of echo signals reflected back to the occupancy sensor from surfaces in or around the associated parking space, and determine, based on the plurality of echo signals received, whether the associated parking space is occupied or empty;
after transmitting the measurement command, sending a status check to the occupancy sensor from the computer-based controller; and
receiving a response to the status check at the computer-based controller, wherein the response includes the occupancy sensor's determination as to whether the associated parking space is occupied or empty.
2. The method of claim 1, further comprising:
advancing the address in the occupancy sensor identifier, and
returning to the transmitting step in claim 1.
3. The method of claim 1, further comprising:
after transmitting the measurement command, setting an indication at the computer-based controller that no additional measurement commands need to be transmitted to the occupancy sensor.

4. The method of claim 1 further comprising:
storing the received response in a computer-based memory for subsequent access and retrieval by a personal computer or electronic parking sign.

5. The method of claim 4, further comprising:
storing an indication in the computer-based memory that an occupancy status associated with the associated parking space has changed from an earlier status of either occupied or empty if the response to the measurement command indicates that the change has occurred,
wherein the personal computer or electronic parking sign assesses whether there has been any such changes by reviewing the stored indications of changes in the computer-based memory, before retrieving any new data from the computer-based controller related to the associated paring space.

6. The method of claim 1, further comprising calibrating one or more of the occupancy sensors from the computer-based controller, wherein calibrating comprises:
transmitting a measurement for calibration purposes command from the computer-based controller to one of the occupancy sensors having an address that corresponds to an address in an occupancy sensor identifier,
wherein the measurement for calibration purposes command is adapted to cause the occupancy sensor to transmit an ultrasonic calibration signal into an associated one of the plurality of monitored parking spaces in the parking facility, receive a plurality of resulting echo signals reflected back to the occupancy sensor from surfaces in or around the associated parking space, and determine, based on the plurality of resulting echo signals received, a calibration measurement value that corresponds to the associated parking space having a particular status;
starting a timer to count off a predetermined amount of time;
if the computer-based controller has received a response to the measurement for calibration purposes command from the occupancy sensor within the predetermined amount of time, storing the response in a computer-based memory; otherwise, if the computer-based controller has not yet received the response to the measurement for calibration purposes command from the occupancy sensor within the predetermined amount of time, setting an indication in the computer-based memory that a calibration error has occurred for the occupancy sensor.

7. The method of claim 6, wherein the particular status of the associated parking space is empty.

8. The method of claim 6, further comprising:
receiving the response to the measurement for calibration purposes command from the occupancy sensor within the predetermined amount of time; and
after receiving the response, determining whether a sufficient number of calibration measurements have been obtained for the occupancy sensor that corresponds to the associated parking space,
wherein the sufficient number of calibration measurements is some number greater than one.

9. The method of claim 8, further comprising:
if it is determined that an insufficient number of calibration measurements have not obtained for the occupancy sensor that corresponds to the associated parking space, then advancing a counter that keeps track of the number of calibration measurements that have been taken for a particular occupancy sensor, and returning to the transmitting a measurement for calibration purposes command step of claim 6.

10. The method of claim 8, further comprising:
if it is determined that the number of calibration measurements obtained for the occupancy sensor of the associated parking space is sufficient, then calculating a baseline calibration value.

11. The method of claim 10, wherein calculating the baseline calibration value comprises:
determining which calibration measurement value appeared most among the number of calibration measurements for the occupancy sensor of the associated parking space.

12. The method of claim 10, further comprising:
calculating a quality indicator associated with the baseline calibration value.

13. The method of claim 12, wherein calculating the quality indicator comprises:
assigning a grade to the baseline calibration value based on how many of the calibration measurement values were the same as the baseline echo measurement value.

14. The method of claim 8, further comprising:
calculating a baseline calibration value by determining which calibration measurement value appeared most among the number of calibration measurements for the occupancy sensor of the associated parking space; and
calculating a quality indicator associated with the baseline calibration value by assigning a grade to the baseline calibration value based on how many of the calibration measurement values were the same as the baseline echo measurement value; and
transmitting the baseline calibration value and the quality indicator to the occupancy sensor of the associated parking space.

15. The method of claim 6, further comprising:
after receiving a response to each of a plurality of measurement for calibration purposes commands from the occupancy sensor, advancing an address in the occupancy sensor identifier and returning to the transmitting a measurement for calibration purposes command step in claim 6.

16. The method of claim 6, further comprising:
prior to the transmitting step, sending a broadcast command to all of the occupancy sensors that are coupled to the computer-based controller, to react in a manner that a human operator can recognize.

17. A controller for a parking space occupancy monitoring system, the controller comprising:
a computer-based processor; and
a computer-based memory coupled to the computer-based processor, wherein the computer-based processor is configured to:
transmit a measurement command from the controller to a selected one of a plurality of occupancy sensors, wherein the selected occupancy sensor has an address that corresponds to an address in an occupancy sensor identifier,
wherein the measurement command is adapted to cause the occupancy sensor to transmit an ultrasonic signal into an associated one of a plurality of monitored parking spaces in a parking facility, receive a plurality of echo signals reflected back to the occupancy sensor from surfaces in or around the associated parking space, and determine, based on the plurality of echo signals received, whether the associated parking space is occupied or empty;

after transmitting the measurement command, send a status check to the occupancy sensor from the controller; and receive a response to the status check at the controller, wherein the response includes the occupancy sensor's determination as to whether the associated parking space is occupied or empty.

18. The controller of claim 17, wherein the computer-based processor is further adapted to calibrate one or more of the plurality of occupancy sensors, wherein the calibration process comprises:

transmitting a measurement for calibration purposes command from the controller to a particular one of the occupancy sensors, wherein the particular occupancy sensor has an address that corresponds to an address in the occupancy sensor identifier, wherein the measurement for calibration purposes command is adapted to cause the occupancy sensor to transmit an ultrasonic calibration signal into an associated one of the plurality of monitored parking spaces in the parking facility, receive a plurality of resulting echo signals reflected back to the occupancy sensor from surfaces in or around the associated parking space, and determine, based on the plurality of resulting echo signals received, a calibration measurement value that corresponds to the associated parking space having a particular status;

starting a timer to count off a predetermined amount of time;

if the computer-based controller has received a response to the measurement for calibration purposes command from the occupancy sensor within the predetermined amount of time, storing the response in a computer-based memory; otherwise, if the computer-based controller has not yet received the response to the measurement for calibration purposes command from the occupancy sensor within the predetermined amount of time, setting an indication in the computer-based memory that a calibration error has occurred for the occupancy sensor.

19. A method comprising:

transmitting a measurement for calibration purposes command from a computer-based controller to one of a plurality of occupancy sensors having an address that corresponds to an address in an occupancy sensor identifier, wherein the measurement for calibration purposes command is adapted to cause the occupancy sensor to transmit an ultrasonic signal into an associated one of the plurality of monitored parking spaces in the parking facility, receive a plurality of resulting echo signals reflected back to the occupancy sensor from surfaces in or around the associated parking space, and determine, based on the plurality of resulting echo signals received, a calibration measurement value that corresponds to the associated parking space having a particular status;

starting a timer to count off a predetermined amount of time;

if the computer-based controller has received a response to the measurement for calibration purposes command from the occupancy sensor within the predetermined amount of time, storing the response in a computer-based memory; otherwise, if the computer-based controller has not yet received the response to the measurement for calibration purposes command from the occupancy sensor within the predetermined amount of time, setting an indication in the computer-based memory that a calibration error has occurred for the occupancy sensor.

20. The method of claim 19, wherein the particular status of the associated parking space is empty.

21. The method of claim 19, further comprising:

receiving the response to the measurement for calibration purposes command from the occupancy sensor within the predetermined amount of time; and after receiving the response, determining whether a sufficient number of calibration measurements have been obtained for the occupancy sensor that corresponds to the associated parking space, wherein the sufficient number of calibration measurements is some number greater than one.

22. The method of claim 21, further comprising:

if it is determined that an insufficient number of calibration measurements have not obtained for the occupancy sensor that corresponds to the associated parking space, then advancing a counter that keeps track of the number of calibration measurements that have been taken for a particular occupancy sensor, and returning to the transmitting a measurement for calibration purposes command step of claim 6.

23. The method of claim 21, further comprising:

if it is determined that the number of calibration measurements obtained for the occupancy sensor of the associated parking space is sufficient, then calculating a baseline calibration value.

24. The method of claim 23, wherein calculating the baseline calibration value comprises:

determining which calibration measurement value appeared most among the number of calibration measurements for the occupancy sensor of the associated parking space.

25. The method of claim 24, wherein calculating the quality indicator comprises:

assigning a grade to the baseline calibration value based on how many of the calibration measurement values were the same as the baseline echo measurement value.

26. The method of claim 23, further comprising:

calculating a quality indicator associated with the baseline calibration value.

27. The method of claim 21, further comprising:

calculating a baseline calibration value by determining which calibration measurement value appeared most among the number of calibration measurements for the occupancy sensor of the associated parking space; and calculating a quality indicator associated with the baseline calibration value by assigning a grade to the baseline calibration value based on how many of the calibration measurement values were the same as the baseline echo measurement value; and transmitting the baseline calibration value and the quality indicator to the occupancy sensor of the associated parking space.

28. The method of claim 19, further comprising:

after receiving a response to each of a plurality of measurement for calibration purposes commands from the occupancy sensor, advancing an address in the occupancy sensor identifier and returning to the transmitting a measurement for calibration purposes command step in claim 6.

29. The method of claim 19, further comprising:

prior to the transmitting step, sending a broadcast command to all of the occupancy sensors that are coupled to the computer-based controller, to react in a manner that a human operator can recognize.

30. A controller for a parking space occupancy monitoring system, the controller comprising:
a computer-based processor; and
a computer-based memory coupled to the computer-based processor, wherein the computer-based processor is configured to:
transmit a measurement for calibration purposes command from a computer-based controller to one of a plurality of occupancy sensors having an address that corresponds to an address in an occupancy sensor identifier,
wherein the measurement for calibration purposes command is adapted to cause the occupancy sensor to transmit an ultrasonic signal into an associated one of the plurality of monitored parking spaces in the parking facility, receive a plurality of resulting echo signals reflected back to the occupancy sensor from surfaces in or around the associated parking space, and determine, based on the plurality of resulting echo signals received, a calibration measurement value that corresponds to the associated parking space having a particular status;
start a timer to count off a predetermined amount of time;
if the computer-based controller has received a response to the measurement for calibration purposes command from the occupancy sensor within the predetermined amount of time, store the response in a computer-based memory; otherwise, if the computer-based controller has not yet received the response to the measurement for calibration purposes command from the occupancy sensor within the predetermined amount of time, set an indication in the computer-based memory that a calibration error has occurred for the occupancy sensor.

* * * * *